US006618061B2

(12) United States Patent
Yamamoto

(10) Patent No.: US 6,618,061 B2
(45) **Date of Patent: *Sep. 9, 2003**

(54) INPUT DISPLAY DEVICE AND METHOD FOR SWITCHING THE PROCESSING FUNCTIONS DISPLAYED IN A PLURALITY OF DISPLAY AREAS

(75) Inventor: Hiranaga Yamamoto, Nara (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,183

(22) Filed: Sep. 14, 1999

(65) Prior Publication Data

US 2003/0058279 A1 Mar. 27, 2003

(30) Foreign Application Priority Data

Sep. 14, 1998 (JP) .......................................... 10-260428

(51) Int. Cl.[7] ............................ G06F 3/14; G06K 15/00

(52) U.S. Cl. ....................... 345/817; 345/825; 345/841; 345/771; 345/173; 358/1.13; 399/81

(58) Field of Search ................................ 345/817, 825, 345/819, 820, 828, 841, 853, 854, 771, 804, 173; 358/1.13, 1.14, 1.15; 399/81, 82, 75, 76, 85

(56) References Cited

U.S. PATENT DOCUMENTS

| | | | | | |
|---|---|---|---|---|---|
| 4,763,356 | A | * | 8/1988 | Day, Jr. et al. | 345/173 X |
| 5,049,929 | A | | 9/1991 | Anderson et al. | 399/82 |
| 5,079,723 | A | | 1/1992 | Herceg et al. | 345/173 X |
| 5,426,732 | A | * | 6/1995 | Boies et al. | 345/173 X |
| 5,689,668 | A | * | 11/1997 | Beaudet et al. | 345/841 |
| 5,714,971 | A | * | 2/1998 | Shalit et al. | 345/804 |
| 5,907,319 | A | * | 5/1999 | Hashimoto et al. | 345/173 |
| 6,034,688 | A | * | 3/2000 | Greenwood et al. | 345/804 X |

* cited by examiner

*Primary Examiner*—Raymond J. Bayerl
(74) *Attorney, Agent, or Firm*—David G. Conlin; Steven M. Jensen; Edwards & Angell, LLP

(57) ABSTRACT

Process conditions for which setting operation is being accepted are displayed occupying a large area, by displaying no contents relevant to processing functions irrelevant to the setting of process conditions on screen. In order to improve the visual recognition of displayed contents and the operability of setting keys, an initial display on a liquid crystal display is divided into a left-hand display area for displaying an appearance drawing of the copying machine and a right-hand display area for displaying a drawing representing finishing conditions of a copied document. If an operation is made in the left-hand display area where a selection of the inputting of settings is entered on position of the copying machine, the contents relevant to the inputting of settings on position of the copying machine are displayed in the right-hand display area; if an operation is made in the right-hand display area where a selection of the inputting of settings is entered on operations affecting finishing conditions and the like, the contents relevant to the inputting of settings on the operations affecting finishing conditions and the like are displayed in the left-hand display area.

20 Claims, 13 Drawing Sheets

INPUT DISPLAY DEVICE AND METHOD FOR SWITCHING THE PROCESSING FUNCTIONS DISPLAYED IN A PLURALITY OF DISPLAY AREAS

FIELD OF THE INVENTION

The invention relates to an input display device which is incorporated in processing devices such as image forming apparatuses and which is capable of providing a display where inputs are made to set process conditions that specify processing contents, and also to a display method providing such a display.

BACKGROUND OF THE INVENTION

When using a multifunctional processing device, the user needs to determine those processes to be executed by the processing device so as to obtain the desired results from the processes. For example, when using an image forming apparatus executing an image forming process on paper, the user selects one of available paper feeding positions where paper is to be fed, or sets process conditions whereby post-processing is to be executed on the paper on which an image has been formed.

A conventional attempt to help the user input settings on process conditions with such a processing device is found in Japanese Laid-Open Patent Application No. 3-181958/1991 (Tokukaihei 3-181958: Published on Aug. 7, 1991) disclosing the inclusion of means that is capable of providing an on-screen display of a plurality of keys to allow the setting of process conditions and also capable of detecting which part of the screen is touched, whereby desired process conditions are set by touching a key displayed on screen.

What is noteworthy in the arrangement disclosed in Japanese Laid-Open Patent Application No. 3-181958/1991 is that the selection of two or more mutually exclusive functions is recognised and a function(s) is(are) automatically cancelled based on priorities that are set in advance but are alterable later, thus helping the user select a processing function easily without a mistake.

However, the conventional input display device having the arrangement disclosed in Japanese Laid-Open Patent Application No. 3-181958/1991 displays in a single display not only the processing function contents for which the user wants to set process conditions, but also the processing function contents that are not desired by the user. For example, the input display device of an image forming apparatus displays, even when a paper feeding position is to be selected, the contents relevant to selection of post-processing functions. As a result, the contents displayed relevant to the process conditions that the user is going to set can occupy only a relatively small display area, making it difficult for the user to visually recognise the displayed contents, and the keys that are to be touched by the user are displayed in relatively small sizes, negatively affecting operability in the inputting of settings on process conditions.

SUMMARY OF THE INVENTION

Being conceived of to solve the aforementioned problems, the present invention has an object to offer an input display device capable of hiding the contents of those processing functions that are irrelevant to the setting of process conditions (i.e., processing functions for which the setting of the process conditions is not currently accepted) from the screen, hence offering a larger display area to the processing functions for which inputs are allowed to set the process conditions, and improving visual recognition of the displayed contents and the operability of the setting keys, and also has an object to offer a display method providing such a display.

In order to achieve the above-mentioned objects, the input display device in accordance with the present invention provides an on-screen display of a plurality of display areas where initial images of a plurality of processing functions are displayed respectively, and an image representing a displayed content relevant to the inputting of settings on at least one of the plurality of processing functions is displayed in the display area relevant to the processing function other than the at least one processing function.

With the arrangement, the contents relevant to the inputting of settings (setting operation) on at least one of the plurality of processing functions of which the initial images are displayed on screen in the respective display areas are displayed in the display areas irrelevant to the at least one processing function. Therefore, during a setting operation of a particular processing function, only contents relevant to the setting operation, such as setting contents, are displayed on screen: in other words, no contents relevant to processing functions other than the particular processing function are displayed on screen. Thus contents relevant to the inputting of settings are displayed occupying a larger portion of the screen and visual recognition can be enhanced.

In order to achieve the above-mentioned objects, the display method in accordance with the present invention is a method of switching a display between a first display state and a second display state, the first display state providing an on-screen display of a plurality of display areas where initial images of a plurality of processing functions are displayed respectively, and the second display state displaying an image representing a displayed content relevant to inputting of a setting on at least one of the plurality of processing functions in the display area relevant to the other processing function.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a drawing showing, as an example, an initial display displayed on a display section of the control panel while the foregoing copying machine is standing-by.

DESCRIPTION OF THE EMBODIMENTS

Figure 1:
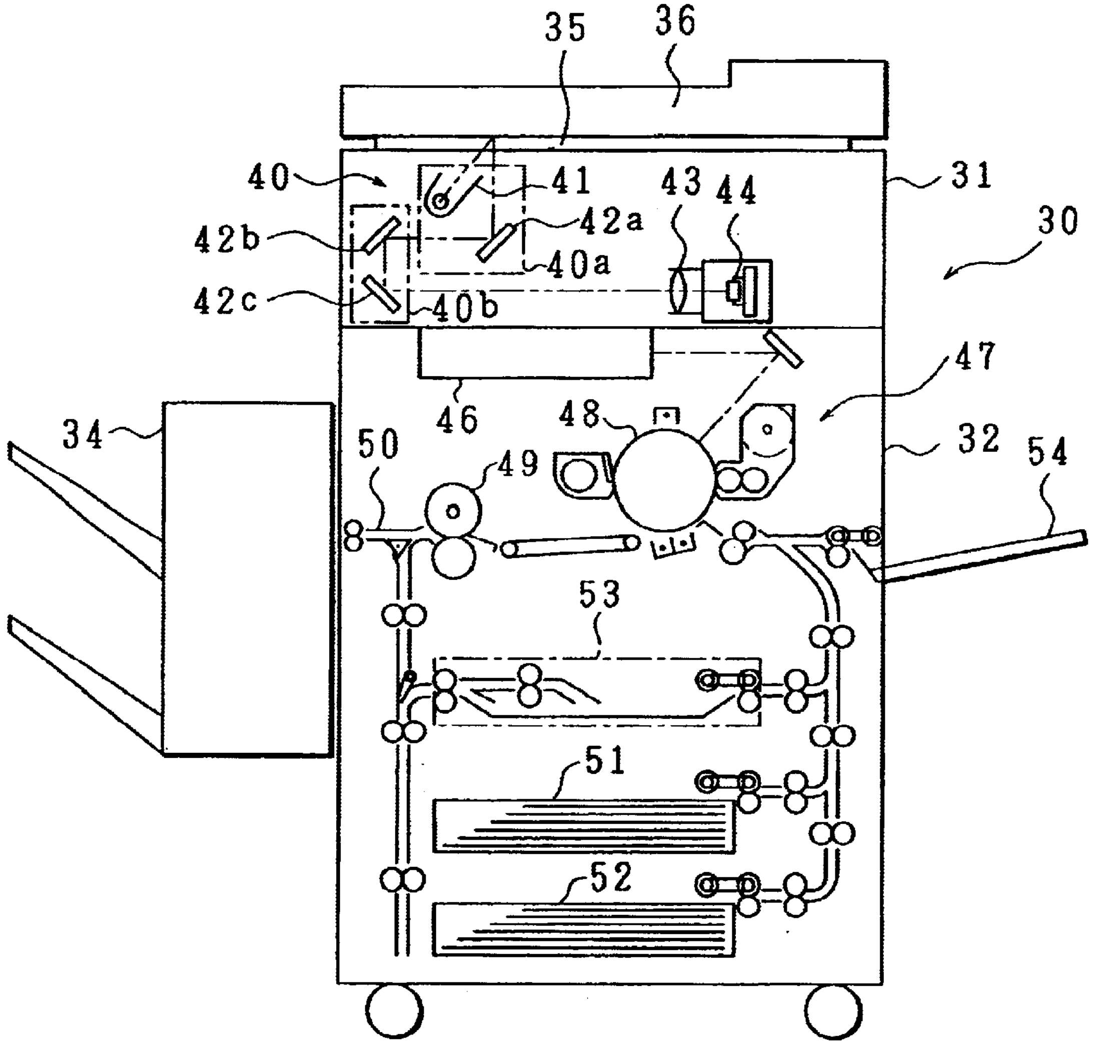
FIG. 1 is a drawing showing an arrangement of a digital copying machine which works as a paper processing device of an embodiment in accordance with the present invention.

FIG. 1 is a drawing showing an arrangement of a digital copying machine which works as a paper processing device of an embodiment in accordance with the present invention. A digital copying machine 30, as an embodiment in accordance with the present invention, executes an image forming process in various modes including copy mode to process original document images, print mode to process image data created by personal computers or other external devices, and facsimile mode to process facsimile images received through a public telephone network.

The digital copying machine 30 is chiefly composed of a scanner section 31 and a laser recording section 32. The scanner section 31 is composed of an original document platen 35 made of translucent glass, a recirculating automatic document feeder (hereinafter will be referred to as an RADF) 36 for feeding original documents on the top surface of the original document platen 35, and a scanner unit 40 for reading the image of an original document placed on the top surface of the original document platen 35. The image data of the original document read by the scanner section 31 is transmitted as an output to the laser recording section 32.

The RADF 36 includes, as primary components thereof, a single-sided original document feeding path extending from an original document tray (not shown) to an ejection tray (not shown) via the original document platen 35; a double-sided original document feeding path for, after completion of the reading by the scanner unit 40 of the image on one side of the original document, reversing the front and back sides of the original document and subsequently guiding the original document to the original document platen 35 again; feeding path switching means for activating the single-sided original document feeding path or the double-sided original document feeding path in response to a selection made by the user, feing rollers and a feeding belt, disposed feeding paths, for applying a feeding force to the original document; and a sensor for monitoring the original document passing through the feeding paths.

The scanner unit 40 is provided with a lamp reflector assembly 41, mirrors 42*a* to 42*c*, a lens 43, and a photoelectric conversion element 44. The lamp reflector assembly 41 is mounted in a first mirror base 40*a*together with the mirror 42*a*. The mirrors 42*b* and 42*c* are mounted in a second mirror base 40*b*. The first mirror base 40*a* moves at a predetermined velocity along the bottom surface of the original document platen 35, and thus scans the entire image on one of the sides of the original document placed on the original document platen 35 by means of beams emitted from the lamp reflector assembly 41. The second mirror base 40*b* moves at half the velocity of the first mirror base 40*a* along the bottom surface of the original document platen 35, and guides beams reflected at the image side of the original document to the lens 43 without changing the length of the beam path. The lens 43 focuses beams reflected at the image side of the original document to form an image at the beam reception surface of the photoelectric conversion element 44. The photoelectric conversion element 44 converts the beams reflected at the image side of the original document to electric signals, and outputs the electric signals to a later-mentioned image processing section.

The laser recording section 32 is provided with a paper transport section 50 for transporting paper, a laser writing unit 46, and an electrophotographic processing section (image forming section) 47. The paper transport section 50 is provided with paper feeding rollers, transport rollers, a transport belt, and paper ejection rollers forming paper transport paths that extend from a manual feed tray 54 and paper feeding cassettes 51 and 52 via the electrophotographic processing section 47 to a post-processing device 34 attached onto a side surface of the copying machine 30 on the paper ejection side.

The paper transport section 50 is further provided with a secondary transport path for reversing—or alternatively not reversing—the front and back sides of the paper having passed a fixing roller 49 and guiding the paper via an intermediary tray 53 to the electrophotographic processing section 47 when in a double-sided copy mode whereby an image is formed on both sides of the paper or in a multi-image copy mode whereby images of a plurality of the original documents are formed on a single side of the paper. Note that the manual feed tray 54 and the paper feeding cassettes 51 and 52 incorporated in the paper feeding section in accordance with the present invention are each provided with a sensor to detect the loading of paper.

The laser writing unit 46 is provided with a semiconductor laser for emitting laser beams based on the image data supplied from the image processing section, a polygon mirror for guiding the beams emitted from the semiconductor laser onto the surface of a photosensitive drum 48 of the electrophotographic processing section 47 in a main scanning direction, and an f-θ lens for changing the laser beams guided by the polygon mirror to polarised constant-velocity beams. With the arrangement, the laser writing unit 46 guides, onto the surface of the photosensitive drum 48, image beams based on the image data having subjected to an image process in the image processing section.

The electrophotographic processing section 47 is provided around the freely-rotatable photosensitive drum 48 with an electric charger, developer device, transfer charger, peeling charger, cleaner, discharger, etc. The surface of the photosensitive drum 48 is uniformly charged either in positive or negative by the electric charger before the image beams are guided thereto by the laser writing unit 46; as the image beams are guided, an electrostatic latent image is formed by light conductivity effect. Toner is supplied to the electrostatic latent image by the developer device to visualise it as a toner image.

The paper transport section 50 guides the paper through between the photosensitive drum 48 and the transfer charger in synchronisation with the rotation of the photosensitive drum 48. The toner image, carried on the surface of the photosensitive drum 48 is transferred to the surface of the paper as a result of corona discharge by the transfer charger. The paper, onto which the toner image has been transferred, is peeled off the surface of the photosensitive drum 48 as a result of corona discharge by the peeling charger, and is thereafter guided to the fixing roller 49 to be heated and pressed so that the toner image melts and fixes on the surface of the paper. The surface of the photosensitive drum 48, from which the toner image has been transferred to the paper, is rid of residual toner by the cleaner and residual electric charge by the discharger, and thereafter charged again by the electric charger to be used in a electrophotographic process repeatedly.

Figure 2:
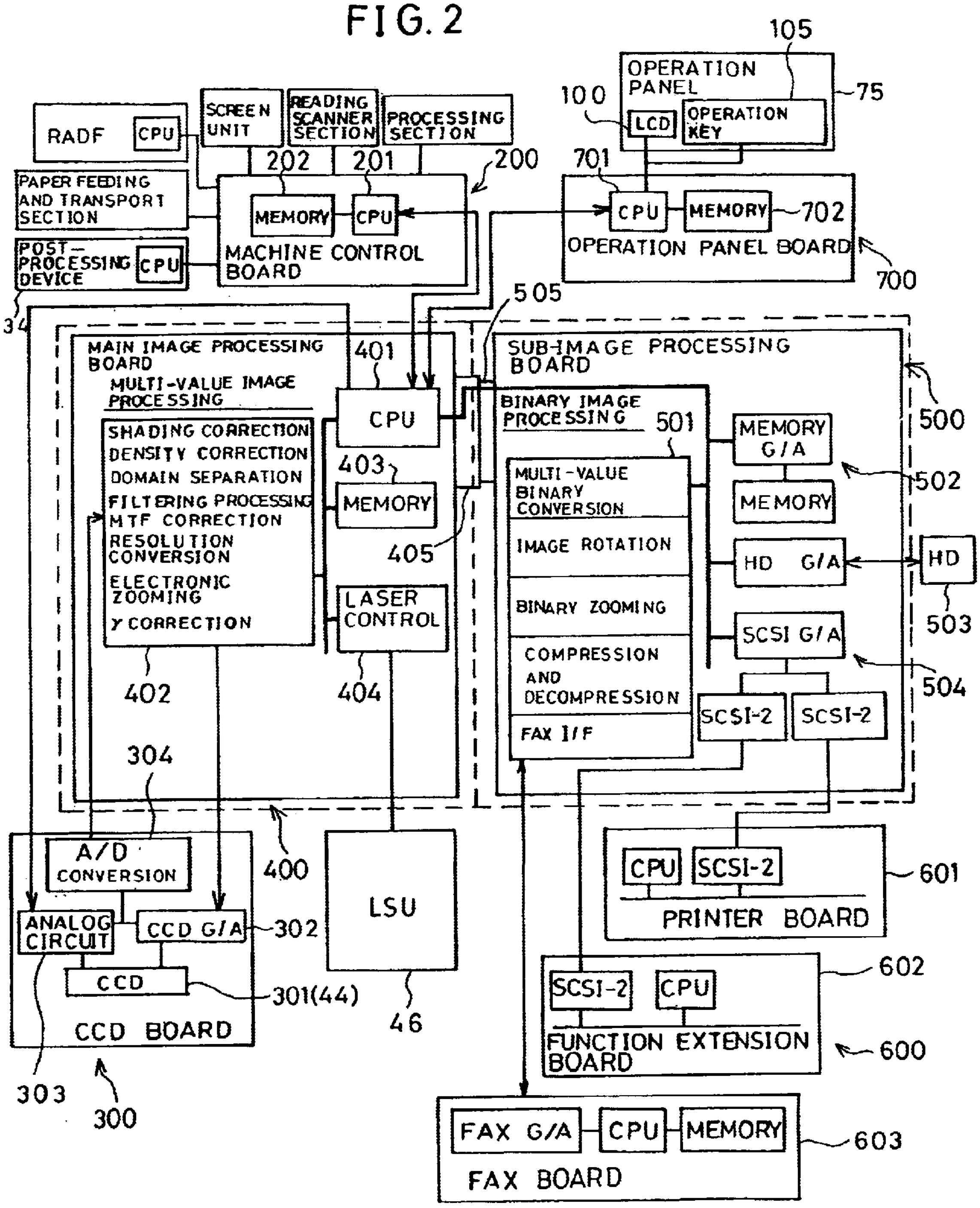
FIG. 2 is a block diagram showing an arrangement of a control section of the foregoing copying machine.

FIG. 2 is a block diagram showing an arrangement of a control section of the foregoing copying machine. Each unit of the copying machine 30 has a CPU mounted on a board thereof; the control section of the copying machine 30 controls the CPUs and hence all the devices composing the units by means of a CPU 401 mounted on a main image processing board 400. In other words, the control section of the copying machine 30 is composed of an operation panel board 700 for manipulating a control panel disposed on the top of the copying machine 30, a machine control board 200 for managing the devices in the copying machine 30, a CCD board 300 on which the photoelectric conversion element 44 is mounted along with other components, a main image processing board 400 on which the CPU 401 for subjecting image data to various basic image processes is mounted along with other components, a sub-image processing board 500 for selectively performing various image processes on the image data that has been subjected to image processes by the main image processing board 400, a printer board 601 compatible with extended functions of the copying machine 30 including printer functions and facsimile functions, and an extended board array 600 composed of a function extension board 602, a facsimile board 603 and the like.

The operation panel board 700 has a CPU 701 being mounted thereon along with memory 702, the CPU 701 serving as a slave CPU with the CPU 401 of the main image processing board 400 as the master CPU. The CPU 701 manages display data to be supplied to a liquid crystal display (LCD) 100 provided to the control panel 75 and operation data of operation keys 105 as well as that of a touch panel, and temporarily stores the data transmitted to and from the CPU 701 in the memory 702. The arrangement of the control panel 75 will be detailed later. Data is exchanged between the CPU 701 and the CPU 401; specifically, the CPU 701 transmits data representing contents of operation instructions entered through the operation keys 105 by the user to the CPU 401, and control display on the control panel 75 based on the data transmitted from the CPU 401 so that the display represents the operation state of the copying machine 30.

The machine control board 200 has a CPU 201 being mounted thereon along with memory 202, the CPU 201 serving as a slave CPU with the CPU 401 of the main image processing board 400 as the master CPU. The CPU 201 manages the post-processing device 34, the RADF 36, the scanner section 31, the electrophotographic processing section 47, and the paper transport section 50.

Mounted on the CCD board 300 are the photoelectric conversion element 44, a gate array 302 for driving the photoelectric conversion element 44, an analogue circuit 303 chiefly for adjusting output signals of the photoelectric conversion element 44 in terms of gain, and an A/D converter circuit 304 for converting output signals of the analogue circuit 303 to digital data. The photoelectric conversion element 44 and circuits 302 to 304 are managed by the CPU 401 mounted on the main image processing board 400.

Mounted on the main image processing board 400 are the CPU 401, a multi-value image processing section 402, memory 403, and a laser control section 404. The multi-value image processing section 402 executes image processing on the image data input through the A/D converter circuit 304 of the CCD board 300 so as to reproduce desired gray scales of the image from multi-value image data: the image processing includes shading correction, density correction, domain separation, filtering processing, MTF correction, resolution conversion, scaling processing, and γ-correction. The memory 403 stores the image data after the image processes, as well as the control data used for the image operation management. The laser control section 404 drives the semiconductor laser of the laser writing unit 46 based on the image data after the image processes.

The sub-image processing board 500 is connected to the main image processing board 400 via the connectors 405 and 505. A binary image processing section 501, memory 502, a hard disk 503, and an SCSI 504 are mounted on the sub-image processing board 500 and controlled by the CPU 401 mounted on the main image processing board 400. The binary image processing section 501 includes a facsimile interface for sending and receiving facsimile images as well as processing sections such as a conversion processing section for converting multi-value image data to binary image data, a rotation processing section for rotating the image, and a scaling processing section for converting the scaling ratio of binary image data. Further, data is transmitted into and out of the memory 502, the hard disk 503, and the SCSI 504 through the gate array.

The extended board array 600 includes, for example, the printer board 601 for receiving image data transmitted from a personal computer or other external devices, the function extended board 602 for allowing an external device to exploit the image data edited by means of the editor functions of the copying machine 30, and the facsimile board 603 for sending and receiving image data through a public telephone network.

The following description will describe how image data is processed by the copying machine 30 in copy mode, print mode, and facsimile mode.

In ordinary copy mode, the images of the original documents fed to the original document platen 35 via the RADF 36 are read sequentially by the scanner unit 40, transmitted to the main image processing board 400 as 8-bit image data, subjected to predetermined image processes in the multi-value image processing section 402, and supplied to the laser writing unit 46 via the laser control section 404. Thus, a tonal copied image is formed by the laser recording section 32 on the recording paper as an output.

In copy mode using electronic RDH functions, the images of the original documents fed to the original document platen 35 via the RADF 36 are read sequentially by the scanner unit 40, transmitted to the main image processing board 400 as 8-bit image data, subjected to predetermined image processes in the multi-value image processing section 402, and supplied to the sub-image processing board 500. In the sub-image processing board 500, the binary image processing section 501 executes binarisation, including error diffusion and other processing, on the 8-bit image data. The data is then stored in the hard disk 503 as 1-bit image data for each original document. All the original documents placed on the RADF 36 are subjected to the processing. The image data of original documents stored in the hard disk 503 is read in order of page numbers for a specified number of times as a result of controlling the gate array, subjected to predetermined image processes in the main image processing board 400, and thereafter supplied to the laser writing unit 46 via the laser control section 404.

Therefore, the images of the original documents need to be read only once regardless of the required number of sets of copied documents. Further, in copy mode using electronic RDH functions, since the image data of the original document placed on the RADF 36 is binarised as it is temporarily stored in the hard disk 503, the hard disk 503 does not need memory of a large capacity. Further, since error diffusion and other processing are executed at the same time with the binarisation, noticeable drop in image quality does not occur. Note that in the image forming processes for a first set, the binarised image data may be written on the hard disk 503 and at the same time transmitted as an output to the main image processing board 400.

In print mode, the image data transmitted from a personal computer or other external devices is decompressed by the printer board 601 to images corresponding to respective pages, temporarily supplied from the SCSI 504 to the sub-image processing board 500, and stored in the hard disk 503. Here, no binarisation is done in the sub-image processing board 500. The image data stored in the hard disk 503 is read in order of predetermined page numbers, transmitted as an output to the main image processing board 400, subjected to processing including γ-correction, and thereafter supplied to the laser writing unit 46 via the laser control section 404.

Facsimile mode involves two operations: namely, the transmission of image data and the reception of image data. When the image data of the original document is to be transmitted, the original documents to be transmitted, placed in the RADF 36, are fed piece by piece to the original document platen 35, and read by the scanner unit 40. The image data of the original document to be transmitted, after being read by the scanner unit 40, is subjected as 8-bit image data to predetermined image processes in the multi-value image processing section 402 of the main image processing board 400, thereafter transferred to the sub-image processing board 500, subjected to binarisation that includes error diffusion, as well as compression in a predetermined format, in the binary image processing section 501, and thereafter stored in the memory 502. Subsequently, as the receiving facsimile number is called over the public telephone network and a state is established where data can be transmitted, the image data stored in the memory 502 is read, subjected to necessary processes such as alteration of compression format in the facsimile board 603, and transmitted to the receiving facsimile device.

When the image data transmitted via a public telephone network is to be received, the image data received by the facsimile board 603 is transmitted to the binary image processing section 501 via the facsimile interface, and decompressed in the binary image processing section 501 reproduced as a page image. The image data to be reproduced as images corresponding to respective pages is transferred to the main image processing board 400, subjected to γ-correction and other image processes, and thereafter supplied via the laser control section 404 to the laser writing unit 46.

As detailed above, in the copying machine 30, the image processing section is divided into the main image processing board 400 for processing multi-value image data and the sub-image processing board 500 for processing binary image data. By being processed as multi-value image data in the main image processing board 400 and then supplied to the laser writing unit 46, the image of the original document read by the scanner section 31 is reproduced on recording paper without losing features thereof. In addition, if the images of an original document including numerous pages are to be reproduced in large quantities, the sub-image processing board 500 speeds up the process by processing the images as binary image data.

Further, the division of the image processing section allows the copying machine to have diverse functions. Since the CPU 401 mounted on the main image processing board 400 controls the components mounted on the sub-image processing board 500, image data can be handled seamlessly and suffer from no distortion in consecutive processes of image data by the main image processing board 400 and the sub-image processing board 500.

Figure 3:
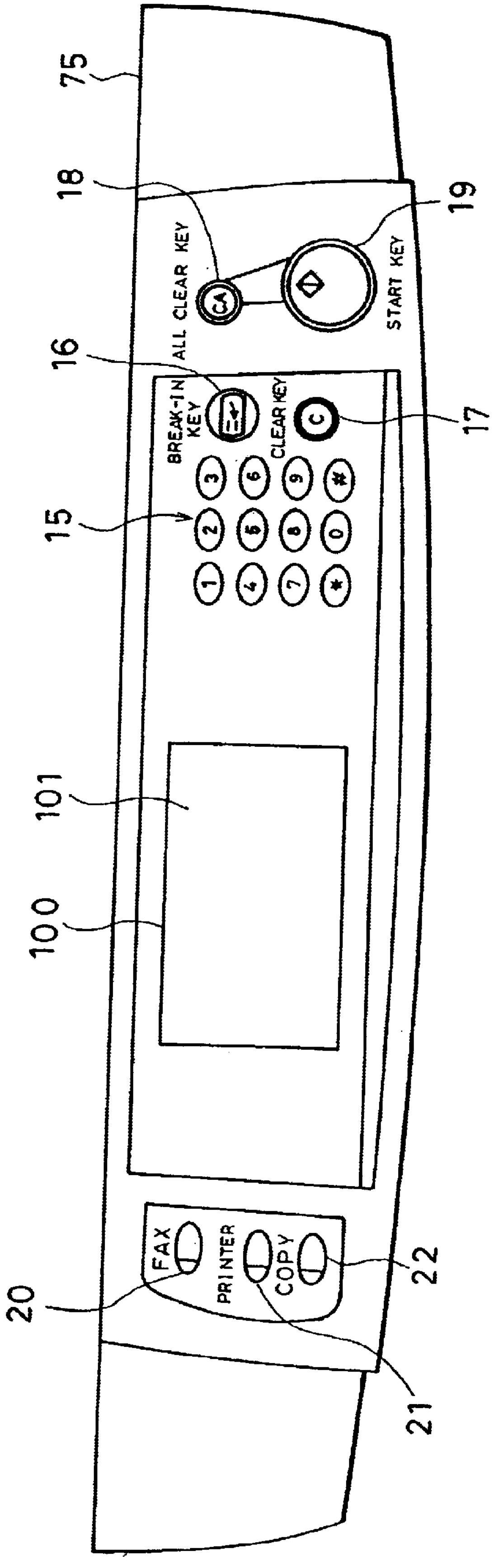
FIG. 3 is a plan view showing a control panel provided to the foregoing copying machine.

FIG. 3 is a plan view showing a control panel incorporated in the aforementioned copying machine. The liquid crystal display 100, disposed in the middle of the control panel 75, is equipped with a transparent touch panel 101 on the surface of the liquid crystal display 100. The touch panel 101 detects operations of the keys displayed by the liquid crystal display 100. To the right of the liquid crystal display 100 on the control panel 75 are located numerical keys 15 for entering numerical information like the desired number of sets of copied documents, a break-in key 16 for allowing copying operations of copy mode to be interposed in other copying operations, a clear key 17 for clearing the settings entered through the numerical keys 15 and the like, an all clear key 18 for returning all the settings of the copying machine 30 to the standard state, and a start key 19 for entering a command to start the copying operations. Further, to the left of the liquid crystal display 100 of the control panel 75 are located mode switching keys 20 to 22 for switching the operation mode of the copying machine 30 among facsimile mode, print mode, and copy mode.

The above configuration of the display device and keys on the control panel 75 is nothing but an example. The configuration of the keys, as well as contents displayed on the liquid crystal display 100, may vary depending on the functions of the copying machine 30.

Figure 4:
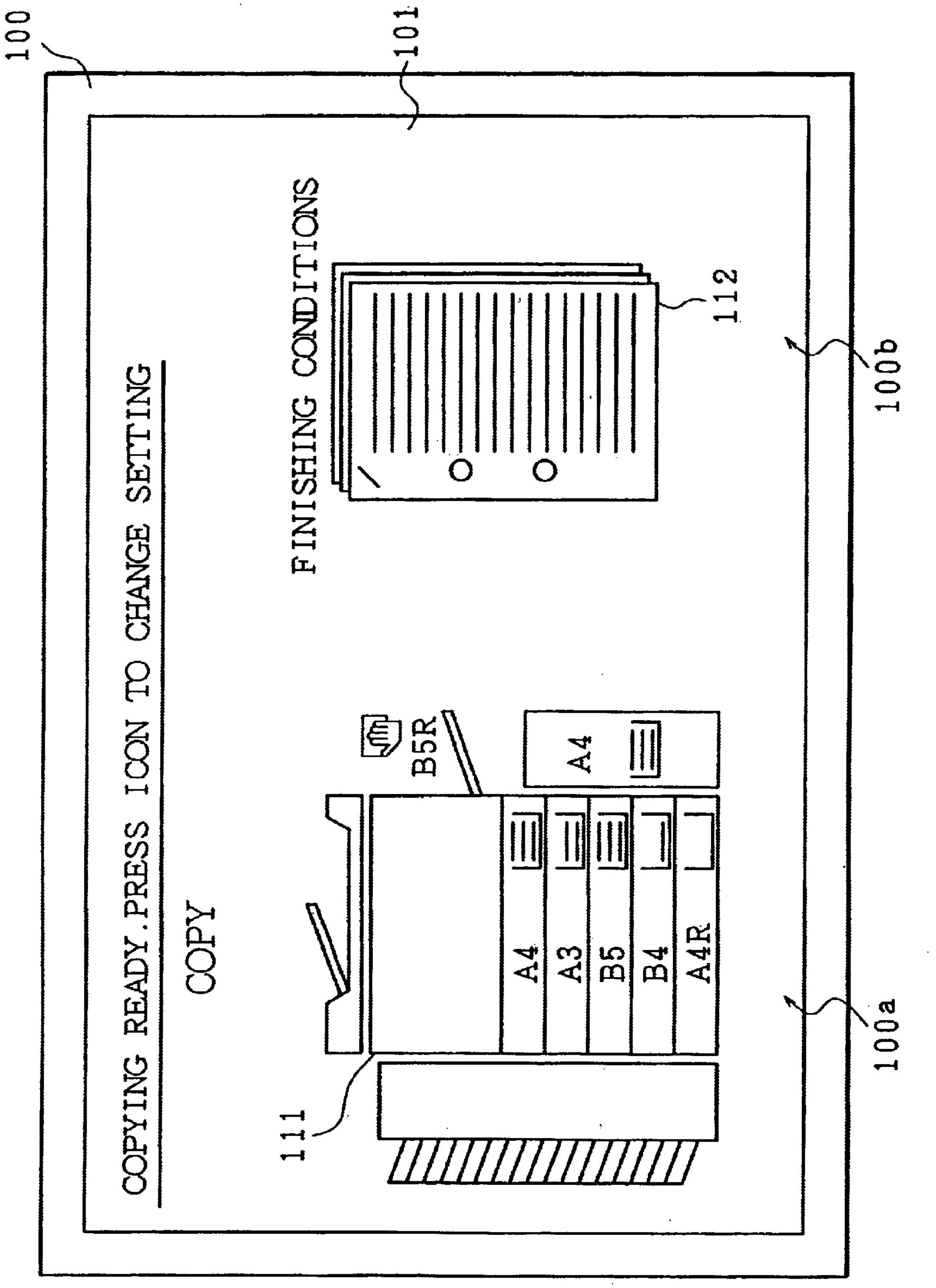

FIG. 4 is a drawing showing an initial display displayed on a display device of the control panel provided to the copying machine. The liquid crystal display 100, since being set to provide a display relevant to copy mode functions as the default display, shows the initial display as in FIG. 4 while the copying machine 30 is standing by in copy mode. This initial display is arranged in two parts shown on the right and left halves of the display surface of the liquid crystal display 100: the left-hand display area 10*a* shows an appearance drawing 111 of the copying machine 30 as the initial image, and the right-hand display area 100*b* shows a drawing 112 illustrating finishing conditions of the copied document as the initial image (first display state). The touch panel 101 disposed on the surface of the liquid crystal display 100 accepts selection of the inputting of settings on position, such as paper feeding position, of the copying machine 30 in the area oppositely facing the left-hand display area of the initial display, and accepts selection of the inputting of settings on the operations affecting finishing conditions of the paper in the area oppositely facing the right-hand display area of the initial display.

Figure 5:
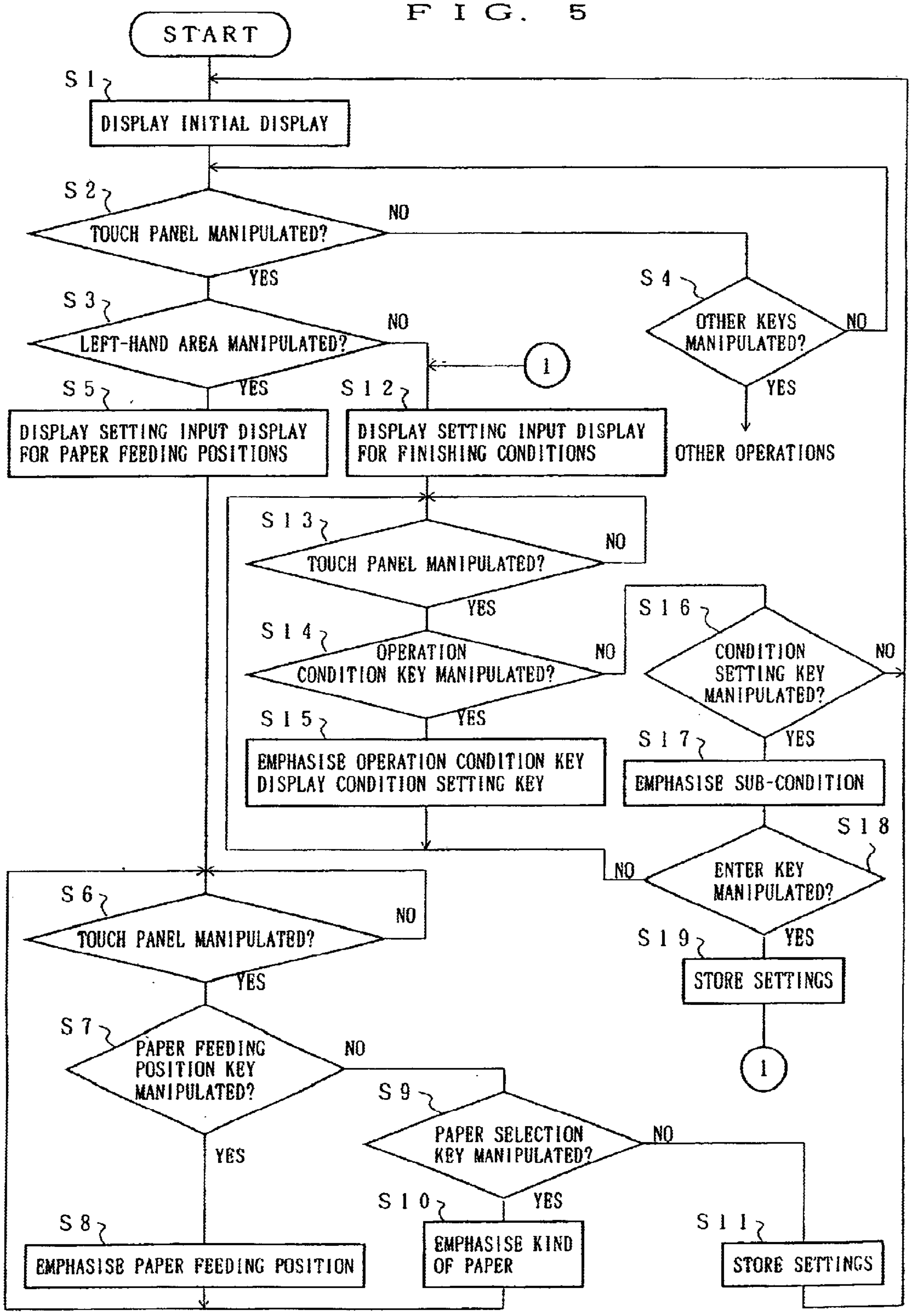
FIG. 5 is a flow chart showing main segments of operations by an operation panel board to control the display section.
Figure 6:
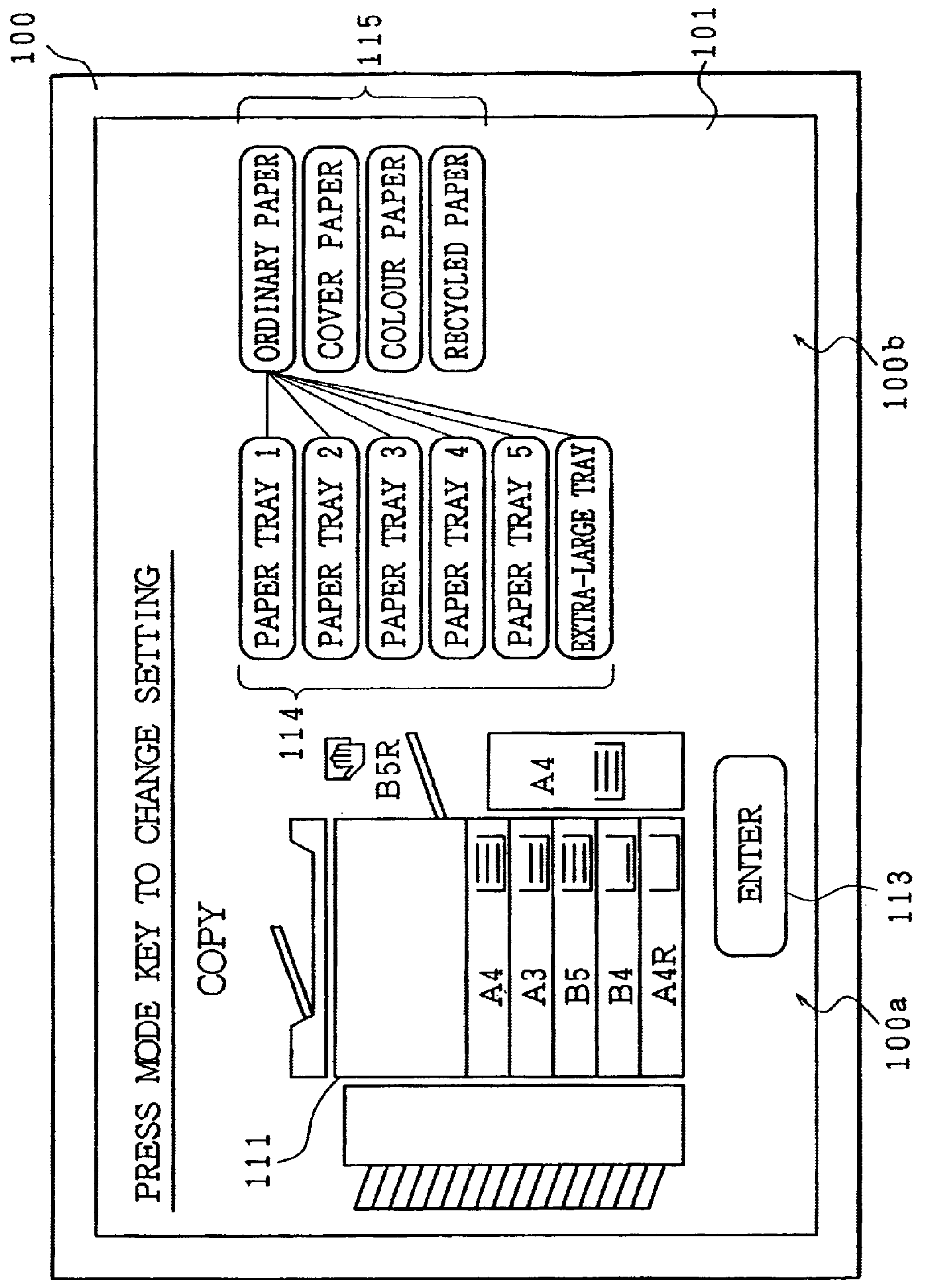
FIG. 6 is a drawing showing a dialogue box being displayed on the display section so as to allow the inputting of settings on paper feeding positions.
Figure 7:
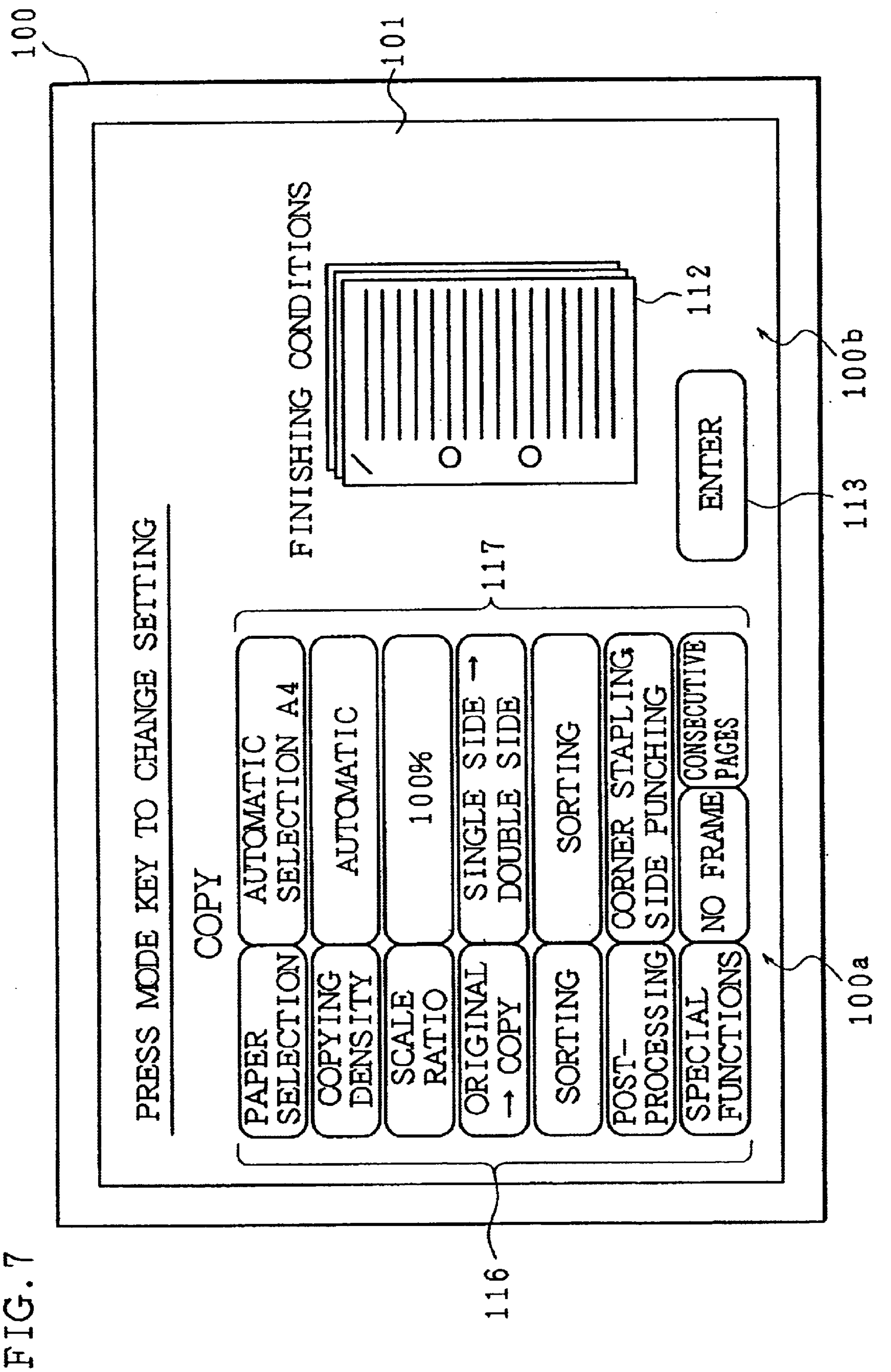
FIG. 7 is a drawing showing a dialogue box being displayed on the display section so as to allow the inputting of settings on finishing conditions.
Figure 8:
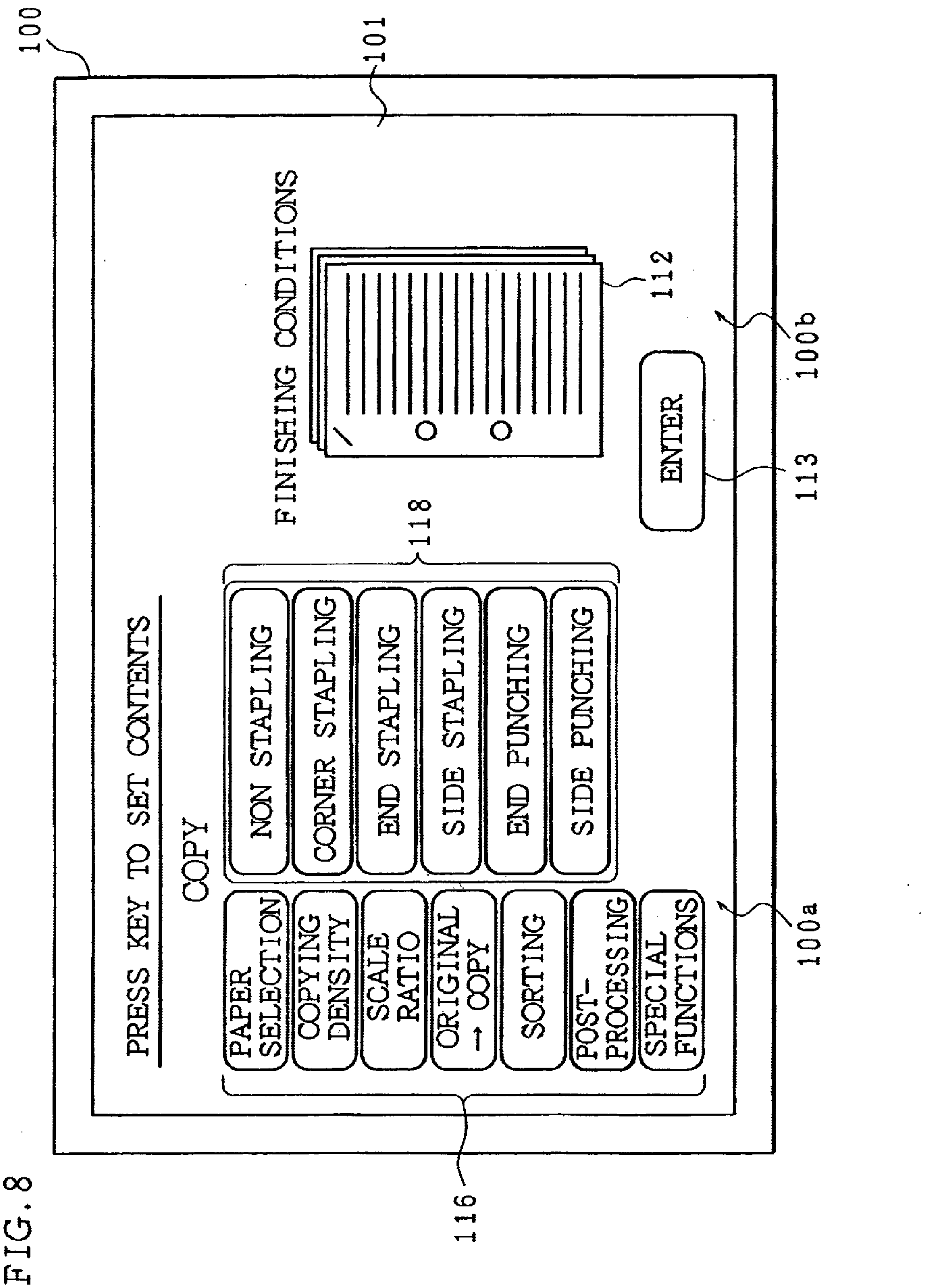
FIG. 8 is a drawing showing a dialogue box being displayed on the display section so as to allow the inputting of settings on post-processing functions.

FIG. 5 is a flow chart showing operations at the operation panel board which is a part of the control section of the copying machine. Further, FIG. 6 to FIG. 8 are drawings showing displays (second display state) where the settings are entered on position of the copying machine of the liquid crystal display. As mentioned above, the detection of the contents displayed on the liquid crystal display 100 and that of the operation state of the touch panel 101, as well as the detection of the operation state of the other keys disposed on the control panel 75, are controlled by the CPU 701 provided to the operation panel board 700. The CPU 701 causes the liquid crystal display 100 to display the initial display shown in FIG. 4 (S1), while the copying machine 30 is standing by in copy mode and awaiting manipulation of the touch panel 101 or other keys by the user (S2, S4). When the user manipulates a key other than the touch panel 101 disposed on the control panel 75, the CPU 701 execute operations according to the contents of the manipulated key (S4).

Having detected a press operation of the touch panel 101, the CPU 701 judges whether the press operation on touch panel 101 was made in the area oppositely facing the left-hand display area 100*a* of the liquid crystal display 100 (S3). If the CPU 701 has detected a press operation in an area oppositely facing the left-hand display area 100*a* of the touch panel 101, the CPU 701 causes the liquid crystal display 100 to display the display as in FIG. 6 where settings are entered on paper feeding positions (S5). In the left-hand display area 100*a* of the setting input display for paper feeding positions, the appearance drawing 111 of the copying machine 30, shown in the left-hand display area 100*a* of the initial display shown in FIG. 4, is shown without any changes, and the enter key 113 is shown below the appearance drawing 111 of the copying machine 30. Meanwhile, in the right-hand display area 100*b* of the setting input display for paper feeding positions, paper feeding position keys 114 each corresponding to one of paper feeding positions available with the copying machine 30 and paper selection keys 115 each corresponding to paper of one of the kinds storable in the paper feeding positions are shown as an image representing contents relevant to the inputting of settings.

While the input setting display for paper feeding positions is shown as in FIG. 6, the CPU 701 accepts the inputting of settings regarding the kind of the paper stored in the paper feeding positions available with the copying machine 30: namely, ordinary paper, cover paper, colour paper, or recycled paper. As a result, a press operation of the touch panel 101 is either executed or awaited (S6). Having detected a press operation of one of paper feeding position keys 114, the CPU 701 causes the operated paper feeding position key 114 to be displayed in an emphasised manner (S7, S8). By contrast, having detected a press operation of one of the paper selection keys 115, the CPU 701 causes the operated paper selection key 115, and the continuous line linking the emphasised paper feeding position key 114 to the paper selection key 115 to be displayed in an emphasised manner (S9, S10). The CPU 701, if having detected a press operation of the enter key 113, causes the relation between the paper feeding position corresponding to the emphasised paper feeding position key 114 and the kind of paper corresponding to the emphasised paper selection key 115 to be stored (S11), and the liquid crystal display 100 to display the initial display shown in FIG. 4 (S11→S1).

The CPU 701, if having detected a press operation in an area oppositely facing the right-hand display area 100*b* of the touch panel 101 in the judging operation of S3, causes the liquid crystal display 100 to display the setting input display for finishing conditions as shown in FIG. 7 (S12). In the right-hand display area 100*b* of the setting input display for finishing conditions, the drawing 112 representing finishing conditions of copied document displayed in the right-hand display area 100*b* of the initial display shown in FIG. 4 is displayed without any changes, and the enter key 113 is shown below the drawing 112 representing finishing conditions. Meanwhile, in the left-hand display area 100*a* of the setting input display for paper feeding positions, operation condition keys 116 each corresponding to one of operation conditions affecting the finishing conditions of the copied paper and a display frame 117 for the currently set values of the operation conditions are shown as an image representing displayed contents relevant to the inputting of settings.

The CPU 701, while showing a setting input display for finishing conditions as shown in FIG. 7, accepts the inputting of settings regarding operation conditions, such as paper selection, copying density, scale ratio, single- or double-sided copy mode, sorting, post-processing, and special functions, all affecting finishing conditions of the copied paper. As a result, the CPU 701 executes or awaits a press operation of the touch panel 101 (S13). Subsequently, if a press operation of one of the operation condition keys 116 is detected, as shown in FIG. 8, the CPU 701 causes the operated operation condition key 116 to be displayed in an emphasised manner, and operation setting keys 118 each corresponding to at least one sub-condition of the operation condition corresponding to the operated operation condition key 116 to be displayed in place of the display frame 117 showing the current settings (S14, S15).

The CPU 701, if having detected a press operation of one of the operation setting keys 118, causes the operated operation setting key 118 to be displayed in an emphasised manner (S16, S17). Thereafter, the CPU 701, if having detected a press operation of the enter key 113, causes the operation corresponding to the emphasised operation setting key 118 to be stored as the operation to be executed (S18, S19), and causes the liquid crystal display 100 to show a setting input display for finishing conditions shown in FIG. 7 (S19→S12).

As detailed above, when accepting the inputting of settings regarding positions of the copying machine 30 and of settings regarding operations affecting finishing conditions of the paper at the liquid crystal display 100 having the touch panel 101, the two kinds of the inputting of settings being irrelevant to each other, the copying machine 30 of the present embodiment provides two display areas in a display to accommodate two initial images where the two kinds of settings are entered, and when either kind of the inputting of settings is selected, contents relevant to that selected kind of the inputting of settings is displayed in the display area where the other kinds of the inputting of settings are entered. This prevents displayed contents irrelevant to the inputting of settings from being displayed on screen, and thus allows the displayed contents for the inputting of settings to be displayed in a large size, enhancing visual recognition of the displayed contents relevant to the inputting of settings.

It should be noted here that if it is detected while the setting input display for finishing conditions shown in FIG. 7 is being displayed that the enter key 113 has been operated, the CPU 701 causes the settings of the conditions to be stored in the memory 702 and the initial display shown in FIG. 4 to be displayed.

An arrangement may be made so that the initial display is redisplayed when a press operation is made either in the left-hand display area 100*a* where the appearance drawing 111 of the copying machine 30 is being displayed or in the right-hand display area 100*b* where the drawing 112 representing finishing conditions is being displayed, with no enter key 113 being displayed in the setting input display for paper feeding positions and the setting input display for finishing conditions. The same arrangement may be made during the display of the operation condition keys 118.

Figure 9:
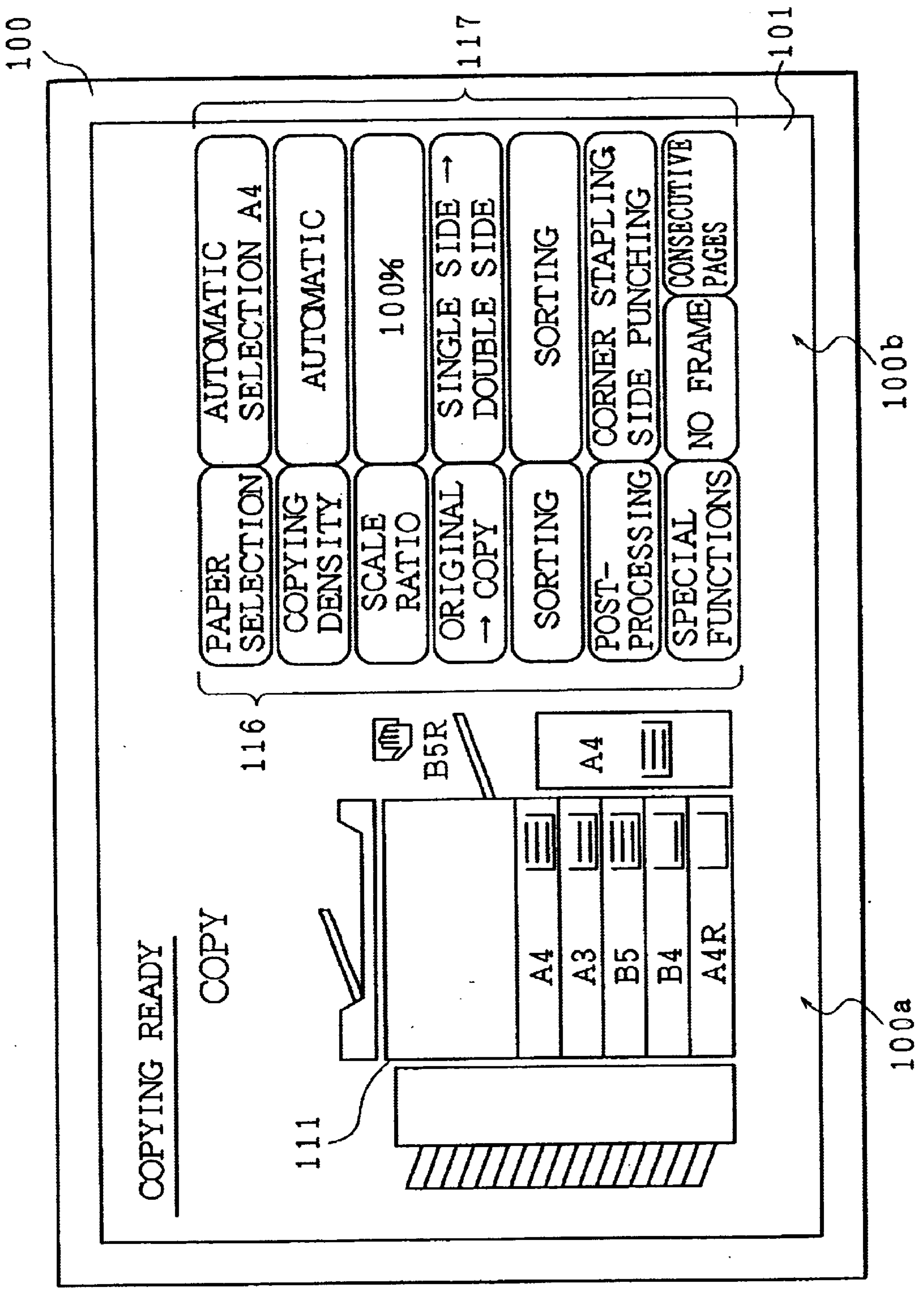
FIG. 9 is a drawing showing an initial display being displayed on a display section of a copying machine as another embodiment in accordance with the present invention.
Figure 10:
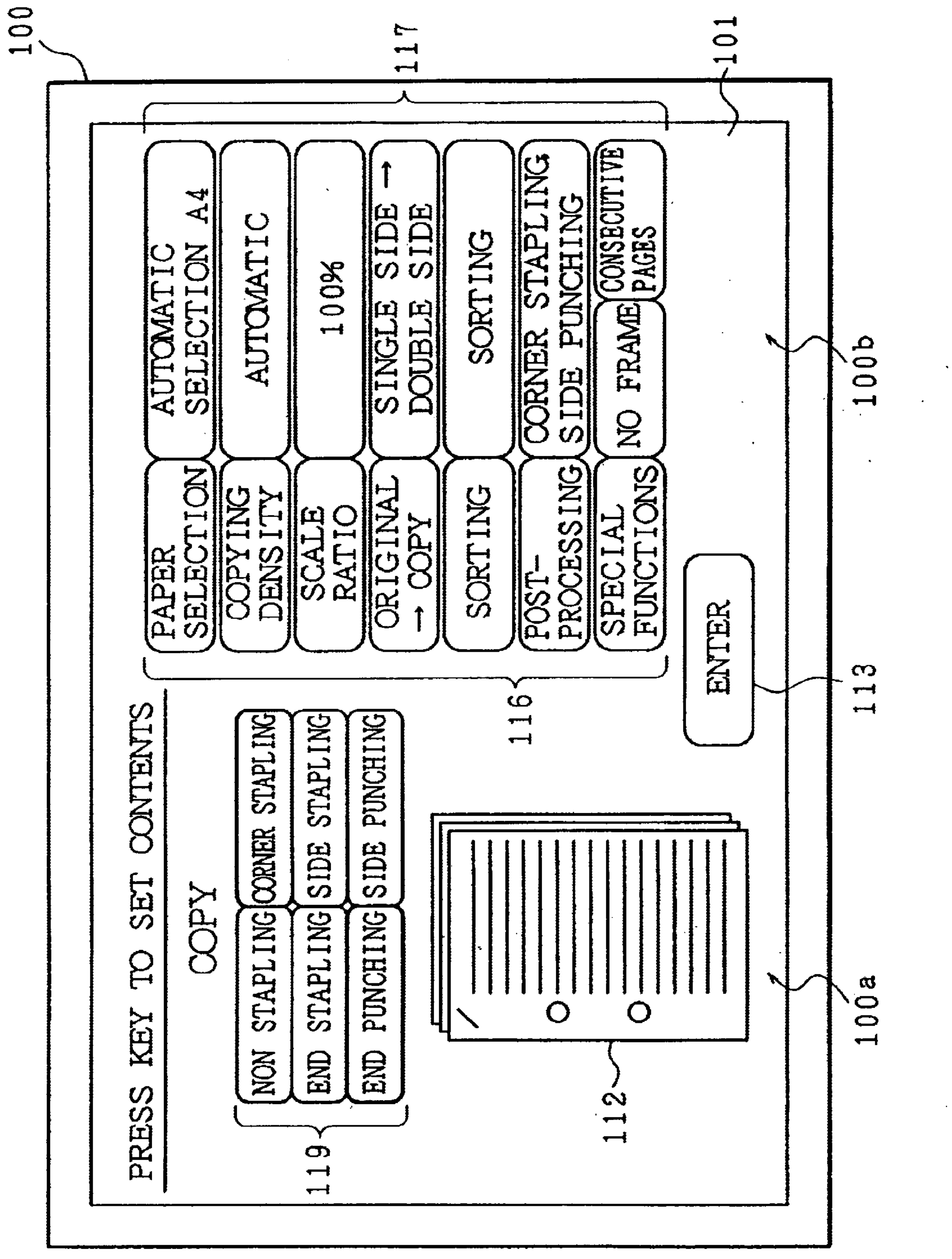
FIG. 10 is a drawing showing a dialogue box being displayed on the display section of the foregoing copying machine so as to allow the inputting of settings on post-processing functions.

FIG. 9 and FIG. 10 are drawings showing the initial display and the setting input display for finishing conditions of a copying machine of another embodiment in accordance with the present invention. The copying machine 30 of the embodiment displays the initial display shown in FIG. 9 on the liquid crystal display 100 while awaiting for an operation in copy mode. In the initial display, the appearance drawing 111 of the copying machine 30 is displayed as the initial image in the left-hand display area 100*a* of the liquid crystal display 100 in the same manner as in the initial display shown in FIG. 4. Meanwhile, in the right-hand display area 100*b*, the operation condition keys 116 and the display frame 117 displayed in the setting input display for finishing conditions shown in FIG. 7 are displayed as the initial image in place of the drawing 112 representing paper finishing conditions shown in the initial display shown in FIG. 4.

While the initial display shown in FIG. 9 is being displayed on the liquid crystal display 100, if a press operation is made in an area of the touch panel 101 oppositely facing the left-hand display area 100*a*, the setting input display for paper feeding position shown in FIG. 6 is displayed on the liquid crystal display 100. By contrast, if a press operation is made in an area of the touch panel 101 oppositely facing one of the operation condition keys 116, the operation setting keys 119 each corresponding to at least one sub-condition of the operation condition corresponding to the operated operation condition key 116 oppositely facing the area where a press operation is made, as well as the drawing 112 representing finishing conditions obtained from setting contents of the current operation conditions, are displayed in the left-hand display area 100*a* of the liquid crystal display 100 as the image representing displayed contents relevant to the inputting of settings.

For example, if a press operation is made on the operation condition key 116 corresponding to post-processing while the liquid crystal display 100 is displaying the initial display shown in FIG. 9, as shown in FIG. 10, the operation setting keys 119 each corresponding to operations that can be set as post-processing is displayed at the top of the left-hand a display area 100*a* of the liquid crystal display 100, and the drawing 112 representing finishing conditions is displayed at the bottom of the left-hand display area 100*a* of the liquid crystal display 100. Further, the enter key 113 is displayed below the operation condition keys 116 in the right-hand display area 100*b* of the liquid crystal display 100.

Therefore, the operation conditions affecting paper finishing conditions and the setting contents of the current operation conditions of the copying machine 30 are displayed along with the operation setting keys 119 on the display for accepting the inputting of settings on operation contents of the copying machine 30. Accordingly, the user can correctly set the operation contents that should be executed by the copying machine 30, while confirming the operation conditions that can be set with the copying machine 30 and the setting contents of the current operation conditions. Further, since the operation setting keys 119 and the drawing 112 representing finishing conditions are located vertically adjacent to each other in the left-hand display area 100*a*, the displayed contents can be displayed in larger sizes for easy visual recognition.

Figure 11:
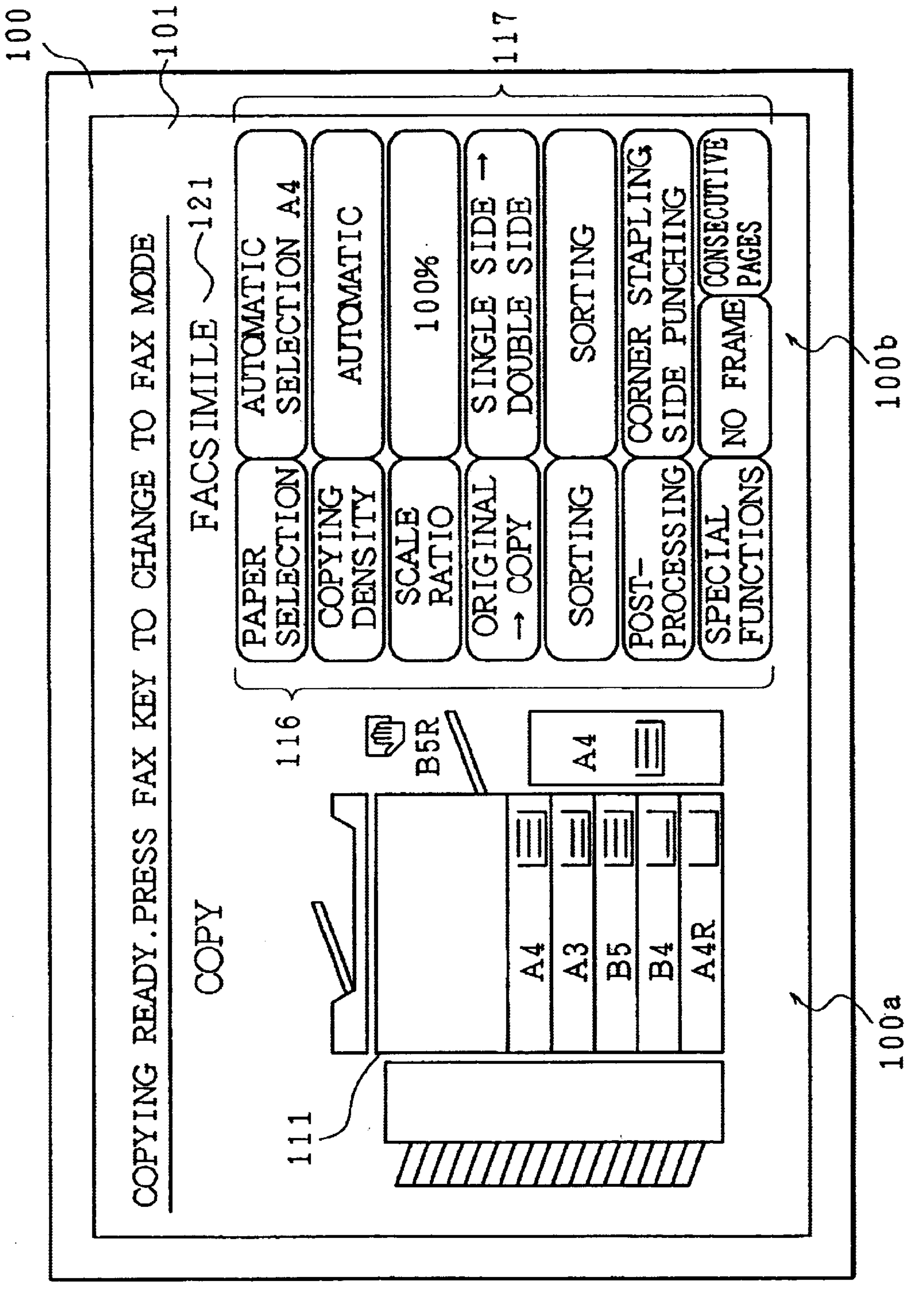
FIG. 11 is a drawing showing an initial display being displayed on a display section of a copying machine as a further embodiment in accordance with the present invention.
Figure 12:
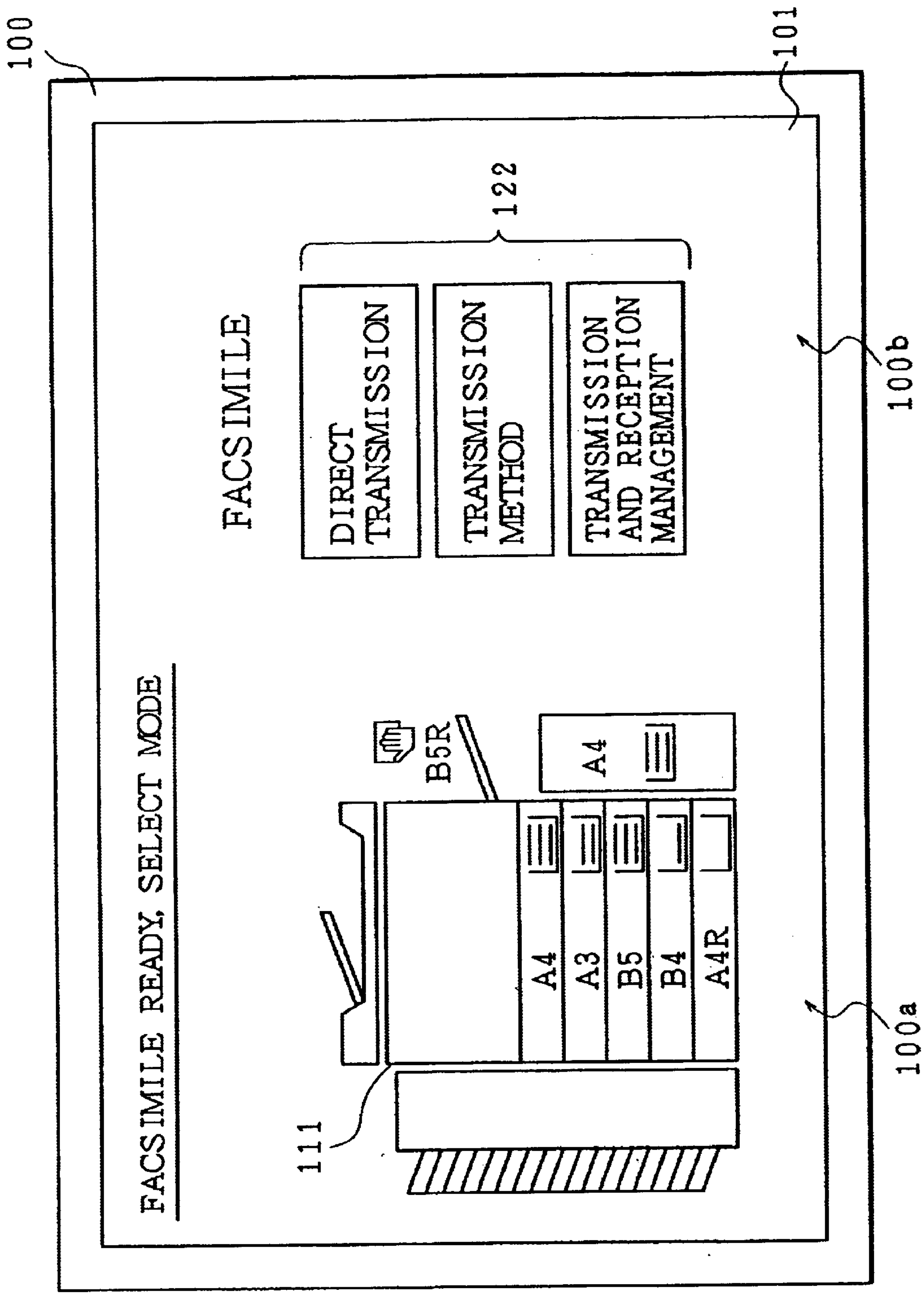
FIG. 12 is a drawing showing a function selection dialogue box being displayed on the display section of the foregoing copying machine so as to allow selection of facsimile modes.
Figure 13:
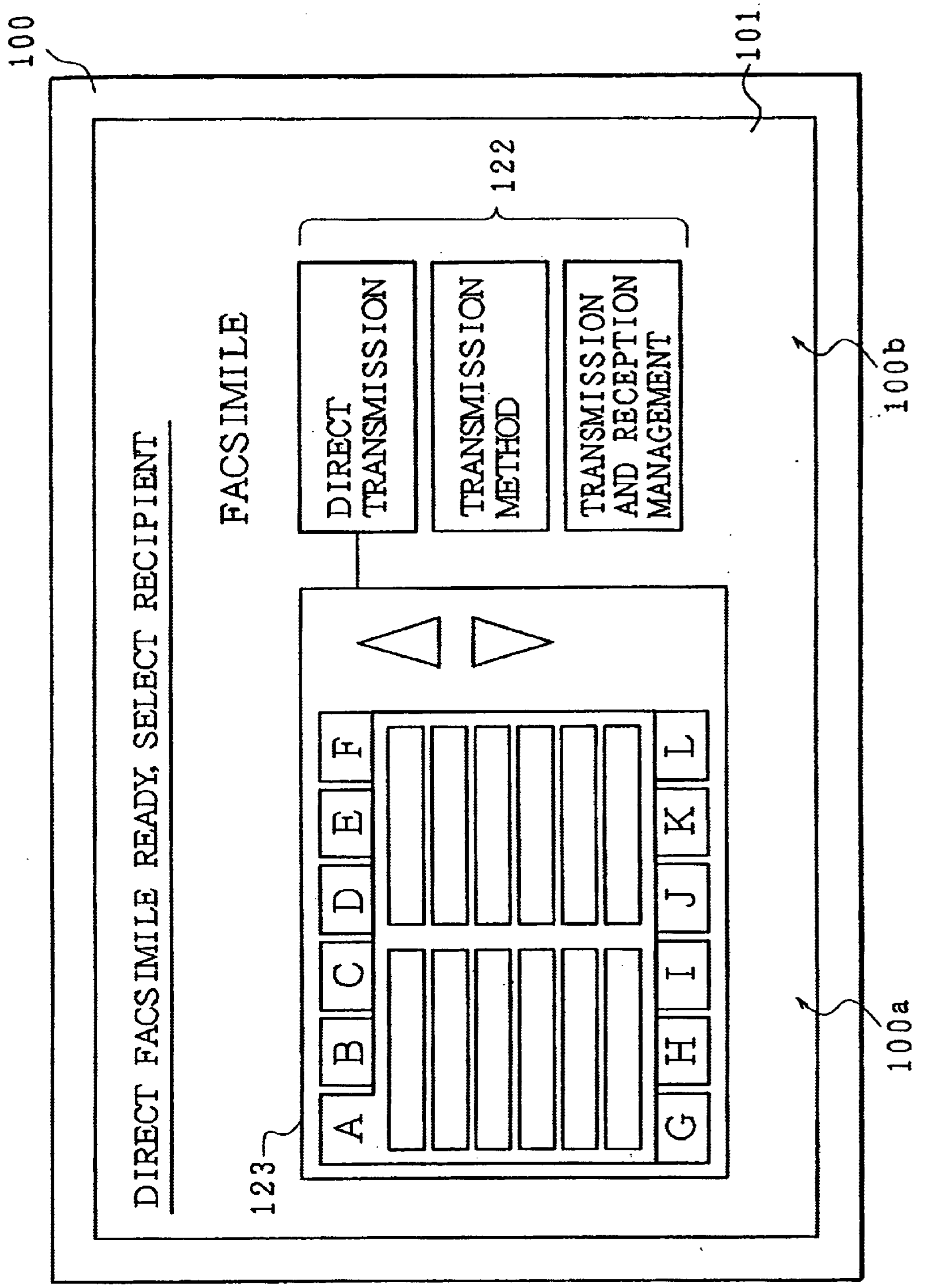
FIG. 13 is a drawing showing a reception selection dialogue box being displayed on the displayed section of the foregoing copying machine so as to allow selection of the recipients of the facsimile transmission.

FIG. 11 to FIG. 13 are drawings showing displays by a copying machine of a further embodiment in accordance with the present invention. When a display relevant to copy mode functions is set as the default display of the liquid crystal display 100, as shown in FIG. 11, a facsimile mode key (initial image retrieving key) 121 for selecting facsimile mode is displayed in the initial display. In the initial display shown in FIG. 11, the appearance drawing 111 of the copying machine 30 is displayed as the initial image in the left-hand display area 100*a* of the liquid crystal display 100 in the same manner as the initial display shown in FIG. 9, and the operation condition keys 116 and the display frame 117 are displayed as the initial image in the right-hand display area 100*b*.

If a press operation is made on the facsimile mode key 121 while the initial display shown in FIG. 11 is being displayed, a facsimile mode function select display (initial image) shown in FIG. 12 is displayed on the liquid crystal display 100. The facsimile mode function select display is displayed as function select keys 122 each corresponding to a function such as direct transmission, transmission method, and transmission and reception management in the right-hand display area 100*b* where the operation condition keys 116 and the display frame 117 are displayed in the initial display shown in FIG. 11.

Further, if a press operation is made on one of the function select keys 122 while the facsimile mode function select display shown in FIG. 12 is being displayed, displayed contents relevant to the functions corresponding to the press-operated functions select key 122 is displayed in the left-hand display area 100*a* of the liquid crystal display 100. For example, if a press operation is made on the function select key 122 for direct transmission, the recipient select display 123 shown in FIG. 13 is displayed on the liquid crystal display 100. The recipient select display 123 lists the names of the recipients whose facsimile numbers are recorded in advance in the left-hand display area 100*a* of the liquid crystal display 100 by sorting them by the first letters of the names.

If a press operation is made on the display position of one of the recipients and a start key (not shown) is manipulated while the recipient select display 123 shown in FIG. 13 is being displayed on the liquid crystal display 100, the copying machine 30 automatically calls the press-operated recipient via a public telephone network, and transmits an image of the original document by facsimile once the line is established.

As detailed above, with the copying machine 30 of the present embodiment, if facsimile mode is selected in the initial display, the displayed contents relevant to the inputting of settings on functions that can be set in facsimile mode is displayed on the liquid crystal display 100 in place of the displayed contents relevant to copy mode. This prevents, when settings are to be entered in facsimile mode, displayed contents irrelevant to facsimile mode from being displayed, and thus allows the displayed contents relevant to facsimile mode to be displayed in a large size, enhancing visual recognition of the displayed contents when settings are to be entered.

Further, as detailed above, with the copying machine 30 of the present embodiment, the right-hand display area 100*b* serves as a common display area to selectively display the initial image of the processing functions relevant to facsimile mode and the initial image of the setting input function for paper finishing conditions, and the initial image of a processing function selected from the processing functions is displayed in the common display area, and the initial image retrieving keys corresponding respectively to the other processing functions are also displayed in the common display area. If a press operation is made on an initial image retrieving key, the initial image of the processing function corresponding thereto is displayed in the common display area.

It should be noted here that although the touch panel 101 is configured to detect a press operation of the key displayed on the liquid crystal display 100 in the aforementioned embodiments, the present invention may be similarly embodied by configuring a plurality of function keys around the liquid crystal display 100, displaying the functions of those function keys on the liquid crystal display 100, and judging a setting entered by the user according to the displayed content that is displayed on the liquid crystal display 100 correspondingly to the operated function key.

Further, the input display device in accordance with the present invention may be such that an image representing a displayed content relevant to the inputting of a setting on at least one of the plurality of processing functions for which setting operation is being accepted is displayed in the display area relevant to the processing function other than the at least one processing function.

With the arrangement, when settings are entered for either one of the processing functions of which the initial images are being displayed in the respective on-screen display areas, the displayed contents relevant to the inputting of settings for that one of the processing functions are displayed in the display areas for the other processing functions. Therefore, no contents irrelevant to the inputting of settings are displayed on screen in respect to any one of the processing functions that are allocated in the respective on-screen display areas, allowing the displayed contents relevant to the inputting of settings to occupy a larger portion of the display, hence enhancing visual recognition of the displayed contents when settings are to be entered, and accordingly helping the user preform setting operation for all the processing functions easily and without a mistake.

Further, the input display device in accordance with the present invention may include a translucent touch panel for detecting a position where a press operation is made on the screen, wherein an image representing a displayed content relevant to inputting of a setting on the processing function shown in the display area oppositely facing the position where the translucent touch panel detects a press operation is displayed in the display area relevant to the other processing function.

With the arrangement, if the surface of the display is pressed at a place oppositely facing one of the display areas, contents relevant to the inputting of settings (setting operation) on the processing function shown in that display area are displayed in the other display areas. Therefore, by selectively making an on-screen press operation on a part oppositely facing the display area of a predetermined processing function, contents relevant to the inputting of settings on the desired processing operation are displayed in other display areas. This helps the user preform setting operations easily and without a mistake.

Further, the input display device in accordance with the present invention may be such that the image representing displayed contents relevant to the inputting of settings on at least one of the plurality of processing functions for which setting operation is being accepted is constituted by at least one image representing a setting content of an upper level, and at least one image representing a setting content of a lower level included in the setting content of the upper level, the at least one image representing a setting content of an upper level and the at least one image representing a setting content of a lower level included in the setting content of the upper level being simultaneously displayed.

With the arrangement, when the setting contents of at least one of the plurality of processing functions for which setting operation is being accepted are constituted by the setting contents of an upper level and the setting contents of a lower level included in one of the setting contents of the upper level, the setting contents of the upper level and the setting contents of the lower level included in one of the setting contents of the upper level are simultaneously displayed in display areas relevant to other processing functions. Therefore, setting contents having a hierarchical structure are simultaneously displayed in display areas relevant to the processing functions other than the processing function for which setting operation is being accepted, reducing the number of switching of the display when settings are entered on processing functions and hence facilitating setting operation.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An input display device for an image fanning apparatus, comprising:

an on-screen display including a first display area and a second display area, each display area having an initial image corresponding to at least one processing function, the initial images of the first and second display areas being displayed simultaneously;

wherein upon selection of the first display area, the initial image displayed in the second display area is replaced by an image of a plurality of settings corresponding to the at least one processing function of the first display area, and upon selection of the second display area, the initial image displayed in the first display area is replaced by an image of a plurality of settings corresponding to the at least one processing function of the second display area;

wherein the first and second display areas do not overlap each other.

2. The input display device as set forth in claim 1, comprising a translucent touch panel for detecting a position where a press operation is made on the screen, wherein the image of the plurality of settings corresponding to the at least one processing function of the first display area is displayed in the second display area after the translucent touch panel detects a press operation in the first display area, or the image of the plurality of settings corresponding to the at least one processing function of the second display area is displayed in the first display area after the translucent touch panel detects a press operation in the second display area.

3. The input display device as set forth in claim 1, wherein the image of a plurality of settings corresponding to at least one of the plurality of processing functions for which setting operation is being accepted is constituted by at least one image representing a setting content of an upper level, and at least one image representing a setting content of a lower level included in the setting content of the upper level, the at least one image representing a setting content of an upper level and the at least one image representing a setting content of a lower level included in the setting content of the upper level being simultaneously displayed.

4. The input display device as set forth in claim 1, providing an on-screen display of two display areas.

5. The input display device as set forth in claim 1, wherein the plurality of processing functions includes processing functions relevant to copy mode, printer mode, and facsimile mode.

6. The input display device as set forth in claim 1, wherein the plurality of processing functions includes a setting input function for a paper feeding position and a setting input function for paper finishing conditions as a processing function relevant to copy mode.

7. The input display device as set forth in claim 1, wherein at least one of the first and second display areas serves as a common display area to selectively display images corresponding to the processing functions.

8. The input display device as set forth in claim 7, wherein an image representing sub-conditions of the function corresponding to the first or second display area is displayed in the common display area, and a primary image representing the function corresponding to the first or second display area is also displayed in the common display area.

9. The input display device as set forth in claim 1, comprising a plurality of function keys, the function keys being operable to select a processing function in one of the first and second display areas.

10. In an image forming apparatus, a display method of switching a display between a first display state and a second display state, the first display state providing an on-screen display including a first display area and a second display area, each display area having an initial image corresponding to at least one processing function, the initial images of the first and second display areas being displayed simultaneously, and the second display state displaying an image of a plurality of settings corresponding to the at least one processing function of the first display area in place of the initial image displayed in the second display area upon selection of the first display area, and displaying an image of a plurality of settings corresponding to the at least one processing function of the second display area in place of the initial image displayed in the first display area upon selection of the second display area, wherein the first and second display areas do not overlap each other.

11. An input display device for an image forming apparatus, comprising:

first and second display areas provided on-screen;

press operation position detecting means for detecting on-screen a press operation position;

switching means for switching a display between a first display state providing an on-screen display of the first and second display areas, each display area having an initial image corresponding to at least one processing function, the initial images of the first and second display areas being displayed simultaneously, and a second display state displaying an image of a plurality of settings corresponding to the at least one processing function of the first display area in place of the initial image displayed in the second display area upon selection of the first display area, and displaying an image of a plurality of settings corresponding to the at least one processing function of the second display area in place of the initial image displayed in the first display area upon selection of the second display area, wherein the plurality of display areas do not overlap each other; and control means for controlling the switching means according to detection of the press operation position by the press operation position detecting means, wherein the display is switched from the first display state to the second display state by the control means controlling the switching means so that the image of the plurality of settings corresponding to the at least one processing function of the first display area is displayed in the second display area, and the image of the plurality of settings corresponding to the at least one processing function of the second display area is displayed in the first display area after the press operation position detecting means detects a press operation in the first or second display areas, respectively.

12. The input display device as set forth in claim 11, wherein the image of a plurality of settings corresponding to one of the plurality of processing functions is constituted by at least one image representing a setting content of an upper level, and at least one image representing a setting content of a lower level included in the setting content of the upper level, the at least one image representing a setting content of an upper level and the at least one image representing a setting content of a lower level included in the setting content of the upper level being simultaneously displayed.

13. The input display device as set forth in claim 11, wherein two display areas are provided on-screen.

14. The input display device as set forth in claim 11, wherein the plurality of processing functions includes processing functions relevant to copy mode, printer mode, and facsimile mode.

15. The input display device as set forth in claim 11, wherein the plurality of processing functions includes a setting input function for a paper feeding, position and a setting input function for paper finishing conditions as a processing function relevant to copy mode.

16. The input display device as set forth in claim 11, wherein at least one of the first and second display areas serves as a common display area to selectively display images corresponding to the processing functions.

17. The input display device as set forth in claim 16, wherein an image representing sub-conditions of the function corresponding to the first or second display area is displayed in the common display area, and a primary image representing the function corresponding to the first or second display area is also displayed in the common display area.

18. An input display device for an image forming apparatus, comprising:

first and second display areas provided on-screen;

a plurality of function keys provided corresponding to a plurality of processing functions respectively;

detecting means for detecting an operation of the plurality of function keys;

switching means for switching a display between a first display state providing an on-screen display of the first and second display areas, each display area having an initial image corresponding to at least one processing function, the initial images of the first and second display areas being displayed simultaneously, and a second display state displaying an image of a plurality of settings corresponding to at least one processing function of the first display area in place of the initial image displayed in the second display area upon selection of the first display area, and displaying an image of a plurality of settings corresponding to the at least one processing function of the second display area in place of the initial image displayed in the first display area upon selection of the second display area, wherein the plurality of display areas do not overlap each other; and control means for controlling the switching means according to detection of the operation by the detecting means, wherein the display is switched from the first display state to the second display state by the control means controlling the switching means so that the first display area or the second display area is selected by operation of one of the plurality of function keys, which is detected by the detecting means.

19. An input display device for an image forming apparatus, comprising:

an on-screen display including a first display area and a second display area, each display area having an initial image corresponding to at least one processing function, the initial images of the first and second display areas being displayed simultaneously;

wherein upon selection of the first display area, the initial image displayed in the the second display area is replaced by an image of a plurality of settings corresponding to the at cast one processing function of the first display area, while the initial image of the first display area is displayed without any changes, and upon selection of the second display area, the initial image displayed in the first display area is replaced by an image of a plurality of settings corresponding to the at least one processing function of the second display area, while the initial image of the second display area is displayed without any changes;

wherein the first and second display areas do not overlap each other.

20. In an image forming apparatus, a display method, comprising the step of switching a display between a first display state and a second display state, the first display state providing an on-screen display including a first display area and a second display area, each display area having an initial image corresponding to at least one processing functions the initial images of the first and second display areas being displayed simultaneously; and the second display state displaying an image of a plurality of settings corresponding to the at least one processing function of the first display area in place of the initial image displayed in the second display area upon selection of the first display area, while displaying the initial image of the first display area without any changes, and displaying an image of a plurality of settings corresponding to the at least one processing function of the second display area in place of the initial image displayed in the first display area upon selection of the second display area, while the initial image of the second display area is displayed without any changes;

wherein the first and second display areas do not overlap each other.

* * * * *